(12) United States Patent
Lu

(10) Patent No.: US 8,113,053 B2
(45) Date of Patent: Feb. 14, 2012

(54) CAPACITIVE ACCELEROMETER

(75) Inventor: Dan Tho Lu, Minden, NV (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 12/242,636

(22) Filed: Sep. 30, 2008

(65) Prior Publication Data

US 2010/0077861 A1    Apr. 1, 2010

(51) Int. Cl.
*G01P 15/125* (2006.01)
(52) U.S. Cl. .................. 73/514.32; 43/514.38
(58) Field of Classification Search ............... 73/514.18, 73/514.32, 514.38
See application file for complete search history.

(56) References Cited

U.S. PATENT DOCUMENTS

| 3,127,481 | A |   | 3/1964  | Herve              |         |
|-----------|---|---|---------|--------------------|---------|
| 3,680,392 | A |   | 8/1972  | Hoffman et al.     |         |
| 3,706,217 | A | * | 12/1972 | Slater et al.      | 73/497  |
| 3,709,042 | A |   | 1/1973  | Lee et al.         |         |
| 4,819,486 | A | * | 4/1989  | Kunkel et al.      | 73/382 R|
| 5,292,569 | A |   | 3/1994  | Barry et al.       |         |
| 5,545,461 | A |   | 8/1996  | Takeuchi et al.    |         |
| 5,627,316 | A |   | 5/1997  | De Winter et al.   |         |
| 5,710,376 | A |   | 1/1998  | Weber, Jr.         |         |
| 6,045,642 | A |   | 4/2000  | Takeuchi et al.    |         |
| 6,182,509 | B1|   | 2/2001  | Leung              |         |
| 6,263,733 | B1|   | 7/2001  | Reimer et al.      |         |
| 6,679,118 | B1| * | 1/2004  | Esashi et al.      | 73/514.32 |
| 7,178,401 | B2|   | 2/2007  | Byrd               |         |
| 7,179,674 | B2|   | 2/2007  | McAlexander, III   |         |
| 2007/0209437 | A1 |   | 9/2007  | Xue et al.    |         |
| 2008/0125701 | A1 |   | 5/2008  | Moberg et al. |         |

OTHER PUBLICATIONS

EP Search Report for EP Application No. 09 17 0910; Dated Jan. 27, 2010.

* cited by examiner

*Primary Examiner* — John Chapman, Jr.
(74) *Attorney, Agent, or Firm* — Cantor Colburn LLP

(57) ABSTRACT

Substantially hemispherical concave first and second surfaces of substantially equal radius and surface area face each other about a proof mass supported for movement between the surfaces. The surfaces and proof mass have electrically conductive portions allowing assessment of differential capacitance for measurement of acceleration. Electrically conductive portions are connected to a conditioning circuit in an embodiment.

19 Claims, 6 Drawing Sheets

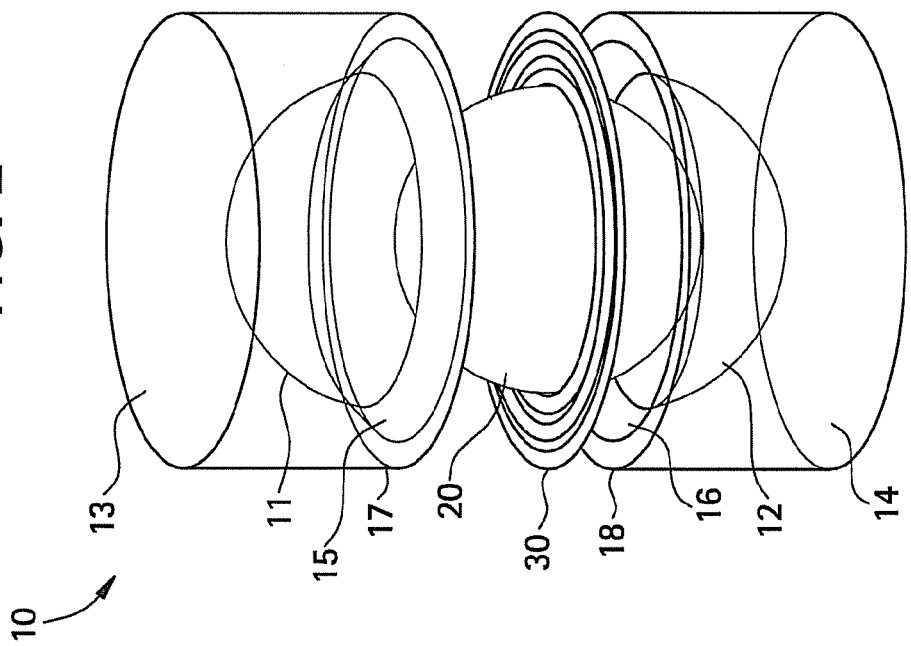
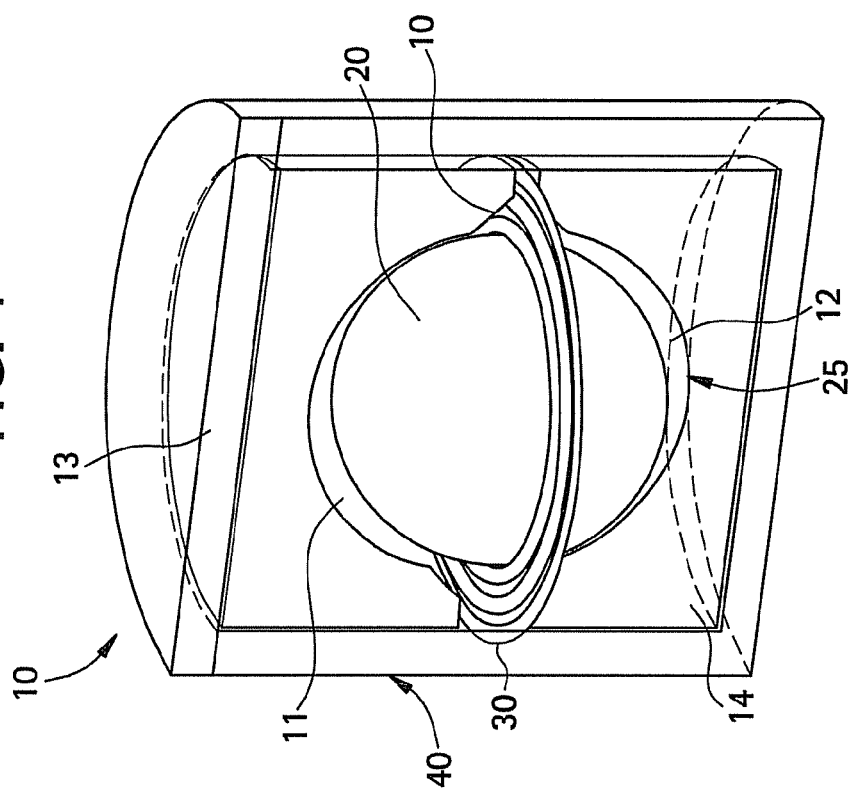

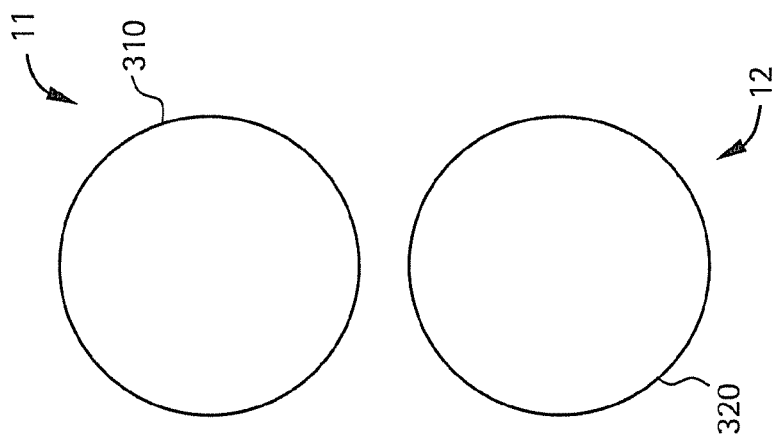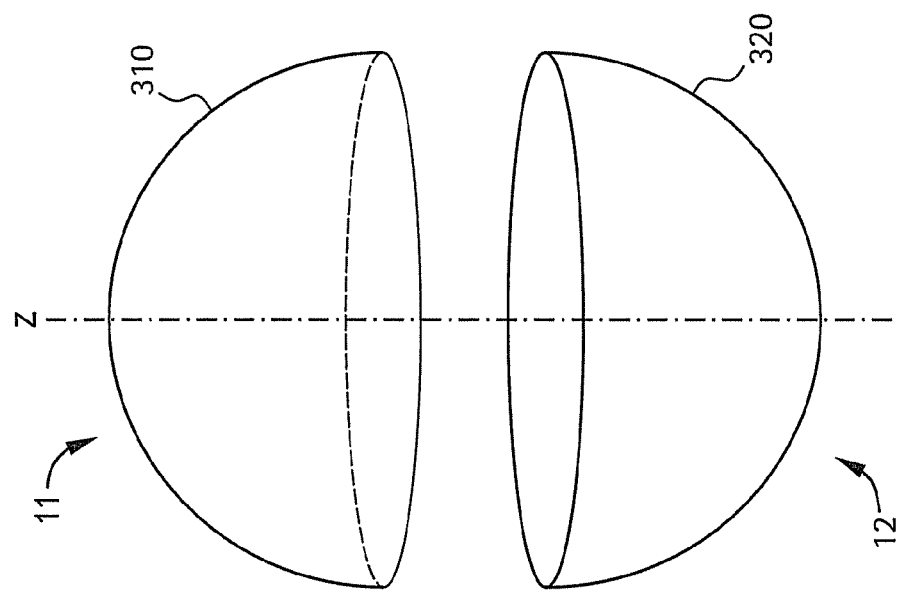

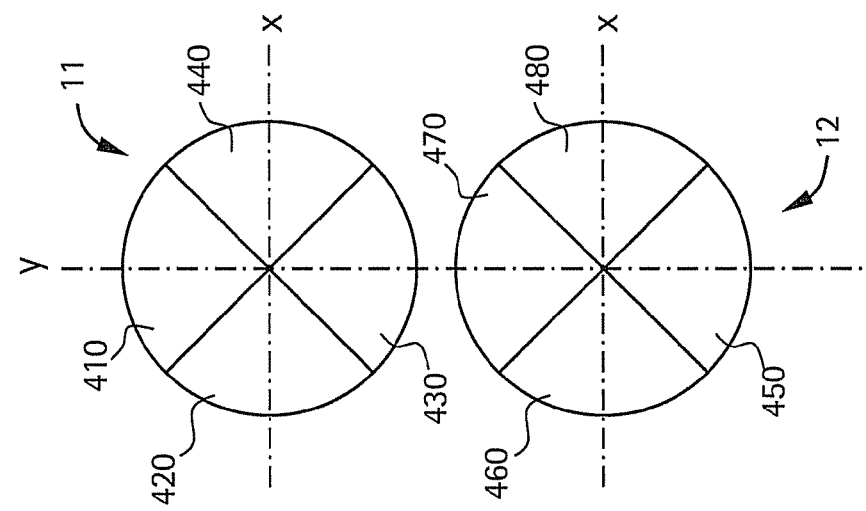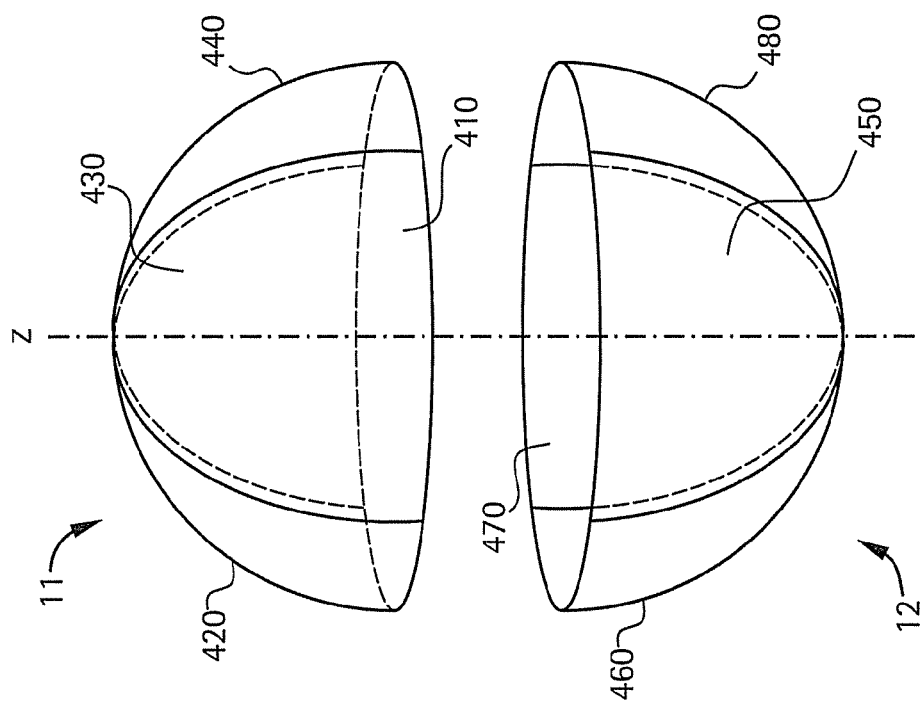

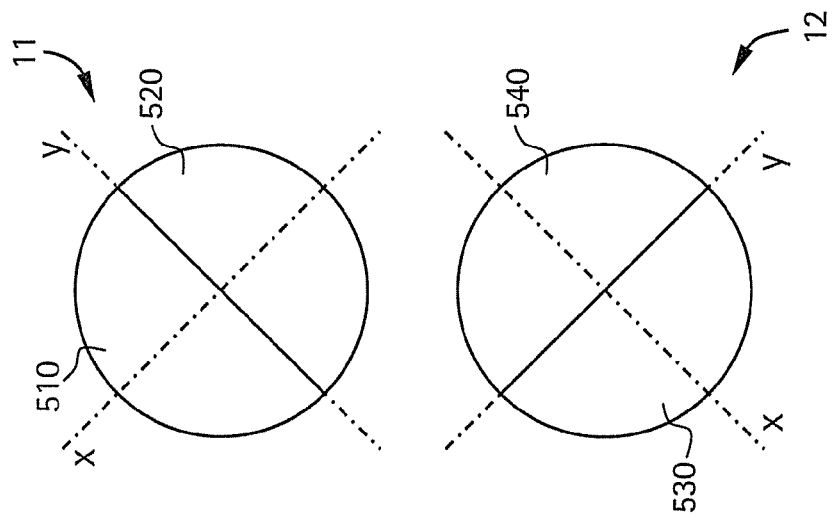
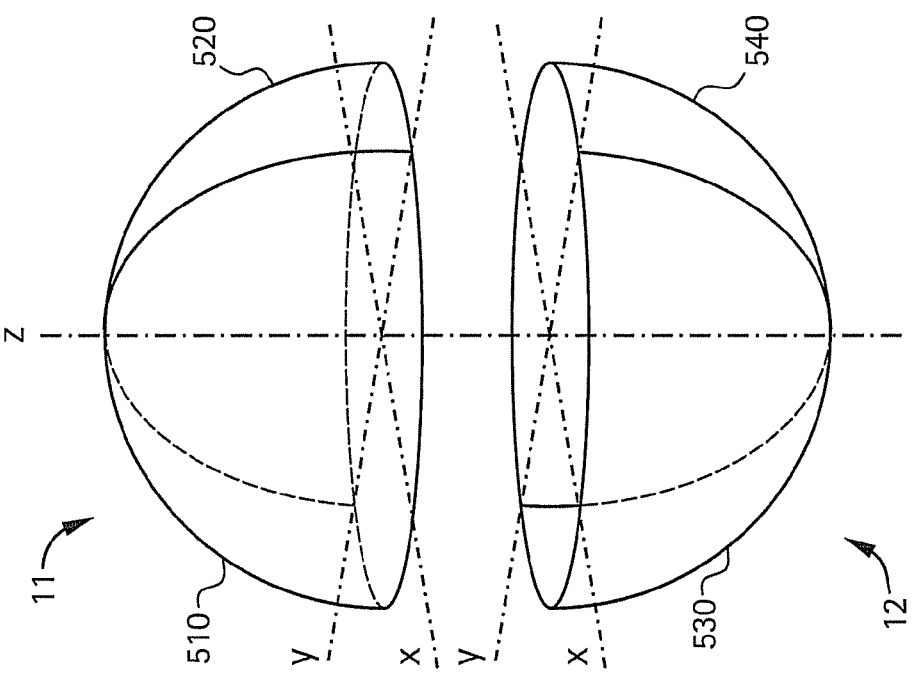

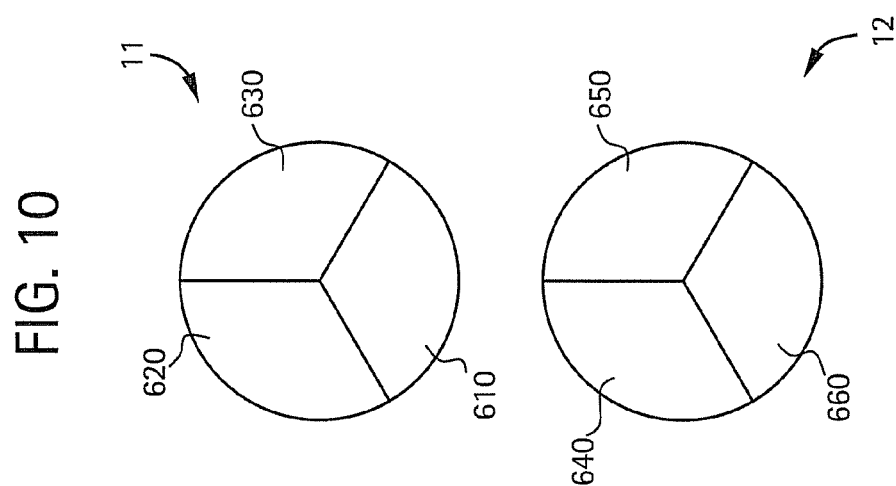
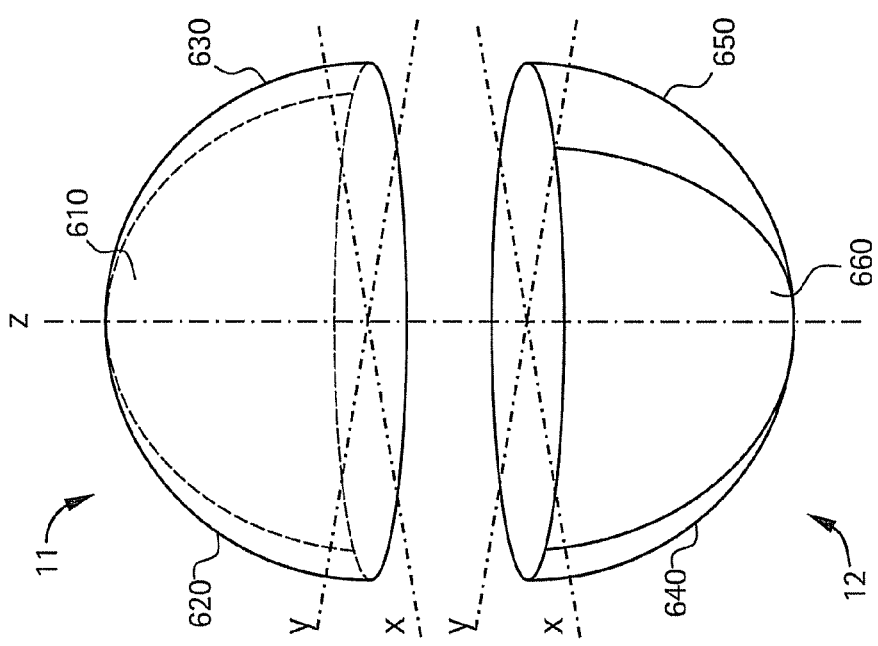

CAPACITIVE ACCELEROMETER

BACKGROUND OF THE INVENTION

The present invention relates to capacitive accelerometers, and, more specifically, to accelerometers tolerant of extreme conditions, particularly of high temperatures.

Accelerometers are used to measure acceleration and come in several forms. Capacitive accelerometers have a conductive mass, called a seismic or inertial proof mass, suspended on a spring of some sort between two conductive plates. A gas, such as air or a non-reactive gas, occupies the space between the mass and the plates. The arrangement forms two capacitors, one between each plate and the proof mass with the gas acting as a dielectric. When the device experiences an acceleration, the proof mass moves closer to one plate or the other, reducing the gap between the proof mass and one plate while increasing the distance between the proof mass and the other plate, changing the capacitance in the capacitors. By comparing the capacitances, the direction and magnitude of the acceleration can be determined. However, most capacitive accelerometers can only measure acceleration along one axis because of their structure. To measure acceleration along more than one axis, one accelerometer must be provided for each axis of interest, which can become complicated. In addition, because of their materials and construction, capacitive accelerometers tend to be susceptible to failure at high temperatures, such as might be experienced in a gas turbine.

BRIEF DESCRIPTION OF THE INVENTION

In an embodiment, an accelerometer has concave first and second surfaces of substantially identical surface area that face each other around a proof mass supported for movement between the surfaces. The surfaces and proof mass have electrically conductive portions allowing assessment of differential capacitance for measurement of acceleration.

Another embodiment has a system including an accelerometer with concave first and second surfaces, the first surface facing the second surface, each having at least one electrically conductive region on a respective portion of each of the first and second surfaces. The accelerometer also has a proof mass supported between the first and second surfaces for movement with at least a portion of the proof mass being electrically conductive. The system includes a conditioning circuit connected to each electrically conductive region of the first and second surfaces and the electrically conductive at least a portion of the proof mass and configured to provide a respective signal indicative of capacitance between each electrically conductive region of the first and second surfaces and the electrically conductive at least a portion of the proof mass.

BRIEF DESCRIPTION OF THE DRAWING

FIG. 1 is a perspective view of an accelerometer according to an embodiment as disclosed herein.

FIG. 2 is a perspective exploded view of an accelerometer according to an embodiment as disclosed herein.

FIGS. 3-10 are schematic views of hemispherical surfaces of accelerometers according to embodiments as disclosed herein.

DETAILED DESCRIPTION OF THE INVENTION

Figure 11:
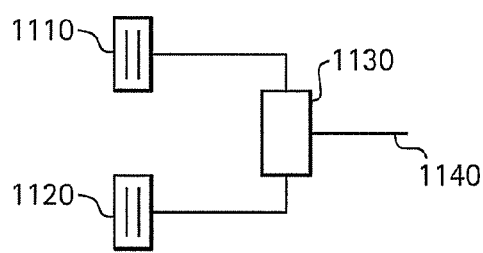
FIGS. 11-13 are schematic views of conditioning circuitry according to embodiments.

With reference to the accompanying FIGS., examples of an accelerometer according to embodiments of the invention are disclosed. For purposes of explanation, numerous specific details are shown in the drawings and set forth in the detailed description that follows in order to provide a thorough understanding of embodiments of the invention. The details shown and described are examples and are not limiting on the scope of the invention. It will be apparent, however, that embodiments of the invention may be practiced without these specific details. In other instances, well-known structures and devices are schematically shown in order to simplify the drawing As seen in FIGS. 1 and 2, an accelerometer 10 according to an embodiment includes hemispherical concave first and second surfaces 11, 12 formed in first and second plates 13, 14, the first surface 11 facing the second surface 12. While hemispherical surfaces are shown in the example embodiments, other configurations could be used within the scope of embodiments, such as, but not limited to, polygonal surfaces, elliptical surfaces, hyperbolic surfaces, and parabolic surfaces, so long as the first and second surfaces have substantially identical profiles and surface area. In the example embodiment shown, the first and second surfaces 11, 12 are of substantially identical radii of curvature, surface area, and other dimensions such as, but not limited to, depth, and perimeter at the surfaces of the plates 13, 14. Each of the first and second surfaces 11, 12 has at least one portion that is or carries an electrically conductive region, each electrically conductive region being centered about the surficial center of its respective portion. A seismic or inertial proof mass 20 is suspended between the first and second surfaces 11, 12 by a spring-like element 30, such as a flexure plate, so that the proof mass 20 can engage in motion in at least one dimension. While a spherical proof mass 20 is shown in the example embodiments, other configurations or profiles could be used within the scope of embodiments, such as, but not limited to, polygonal, elliptical, hyperbolic, and parabolic profiles. The spring-like element 30 in an embodiment constrains the proof mass 20 to motion along the longitudinal axis of the accelerometer, while in other embodiments, the spring-like element 30 allows motion in two or three dimensions. As is known, the motion of an object in multidimensional spaces can be described by components of its motion along axes. For example, two dimensional motion can be described by components of motion along two mutually perpendicular axes. Similarly, for example, three dimensional motion can be described by components of motion along three mutually perpendicular axes.

At least a portion of the proof mass 20 is electrically conductive. The space 25 between the proof mass 20 and the first and second surfaces 11, 12 is filled with a gas that acts as a dielectric. In an embodiment, the gas is non-reactive, or has low reactivity, at high temperatures, such as helium, though other gases can be used as long as they have suitably low reactivity for the purpose disclosed herein. To allow for deflection of the spring, each of the first and second plates of an embodiment include a cut-out, such as a frustroconical cut-out 15, 16 around the opening of the respective hemispherical surfaces 11, 12. The remaining portions of the engaging surfaces 17, 18 of the first and second plates 13, 14 engage and retain the flexure plate. In embodiments, the first and second plates 13, 14, the spring-like element 30, and the proof mass are made of a non-conductive material. The electrically conductive portions of the first and second plates 11, 12 and proof mass 20 in an embodiment are formed by applying metal coatings to the first and second surfaces 11, 12 of the plates 13, 14 and the proof mass 20. Such coatings will have a thickness, but so long as the thickness is substantially uniform, the effect of the thickness is balanced and/or negligible.

In high temperature application embodiments, the metal coatings of embodiments are made from a metal with a high melting point so that the coatings are unperturbed at the high temperatures to which the accelerometer is to be exposed.

The material from which first and second plates 13, 14 of high temperature application embodiments are made in is a ceramic material that tolerates high temperatures. Other materials can be employed for other applications as appropriate within the scope of the invention. While the plates 13, 14 are shown in FIGS. 1 and 2 as being cylindrical, other shapes can be employed in embodiments. Similarly, while the cutout portions 15, 16 that allow motion of the flexure plate 30 are shown as frustroconical, other shapes can be applied as long as they accommodate the appropriate motion of the flexure plate 30. The material from which the seismic or inertial proof mass 20 is made is also a ceramic material in embodiments, particularly in high temperature application embodiments, though other suitable materials can be used.

As shown in FIG. 1, the flexure plate 30 is attached to the proof mass 20 so that the inner periphery of the flexure plate 30 moves with the proof mass 20. At its outer periphery, the flexure plate 30 is held by the ends 17, 18 of the upper plate 13 and the lower plate 14. An outer housing 40 can be included to hold the assembly together and to provide a sealed chamber to hold the dielectric gas. The outer housing can be stainless steel, ceramic, or another suitable heat-tolerant material for high temperature application embodiments. The outer housing 40 shown in FIG. 1 is only an example, and other shapes, sizes, types, and assemblies of outer housings can be used without departing from the scope of embodiments.

As seen in FIGS. 3 and 4, each hemispherical surface 11, 12 of an embodiment has one portion carrying a respective electrically conductive region 310, 320. In the embodiment shown in FIGS. 3 and 4, each entire surface 11, 12 is coated with a metal to form the electrically conductive regions 310, 320, but smaller coated areas can be employed to form the electrically conductive regions 310, 320 as long as they are the same size and the centers of the electrically conductive regions 310, 320 coincide with surficial centers of the respective surface to which they are applied. Each electrically conductive region 310, 320 forms a capacitor with the proof mass 20. When a single coated portion 310, 320 is on each surface, the accelerometer 10 can measure a component of acceleration along a single axis by virtue of the change in capacitance induced by deflection of the proof mass 20 when the accelerometer 10 experiences acceleration, or at least a component thereof, along the axis. For example, as seen in FIG. 3, the single axis of measurement, labeled the z-axis, passes through the centers of the hemispheres.

As seen in FIGS. 5 and 6, an embodiment employs four portions in each hemispherical surface 11, 12 that are or carry electrically conductive regions 410, 420, 430, 440, 450, 460, 470, and 480. Combinations of the regions are employed to measure acceleration or components thereof in three dimensions. Each of the eight electrically conductive regions 410, 420, 430, 440, 450, 460, 470, and 480 are electrically isolated from adjacent ones of the electrically conductive regions. Electrical isolation is achieved, for example, by leaving portions of the surfaces uncoated to form borders between the regions. Each electrically conductive region effectively forms a capacitor with the spaced-apart proof mass. Opposed pairs of the regions form opposed capacitors that can measure acceleration, or at least components thereof, along axes passing through the respective opposed pairs. In addition, opposed pairs of sets or groups of the regions can be used to measure acceleration, or at least components thereof, along axes passing through the respective opposed pairs of groups of the regions. For example, in embodiments, using combinations of the eight electrically conductive regions as seen in FIGS. 5 and 6 allows measurement of acceleration in space by, for example, measuring components of the acceleration along the three mutually perpendicular Cartesian axes. Measurement of the component of acceleration along the y-axis as labeled in FIG. 6 can be achieved by comparing the total capacitance of a first set of regions 410 and 450 to the total capacitance of a second set of regions 430 and 470, along the x-axis as labeled in FIG. 6 by comparing the total capacitance of a third set of regions 420 and 460 to the total capacitance of a fourth set of regions 440 and 480, and along the z-axis by comparing the total capacitance of a fifth set of regions 410-440 to the total capacitance of a sixth set of regions 450-480, for example. Other sets and orientations can be used in embodiments to provide similar results.

In an embodiment, as with the single electrically conductive region per hemispherical surface embodiment discussed above, the electrically conductive regions can be smaller than the respective portions of the surface to which they are applied as long as the center of each electrically conductive region coincides with the surficial center of the respective portion to which it is applied. In addition, the electrically conductive regions should all be the same size in embodiments.

A more general principle according to embodiments is that opposed pairs of capacitors formed by opposed electrically conductive regions or opposed symmetric sets or groups thereof and the proof mass can measure accelerations along an axis passing through the centers of the opposed electrical portions and the center of the proof mass in its initial position. Thus, embodiments are not limited to one or four electrically conductive regions per hemispherical surface as described above, but can have two, three, five, or more electrically conductive regions as appropriate for a given situation. Current manufacturing practices render some embodiments too difficult and/or costly to employ, but it is expected that refinements and improvements in manufacturing will enable easier and less costly manufacture of many, if not all, embodiments that might be useful.

For example, as seen in FIGS. 7 and 8, an accelerometer that can measure acceleration in a plane is shown according to an embodiment. Each hemispherical surface 11, 12 has two electrically conductive regions 510, 520, 530, 540 electrically isolated from each other. As above, the electrical isolation is achieved by simply leaving portions of the surfaces uncoated to form the desired borders between the regions. Each region effectively forms a respective capacitor with the spaced-apart proof mass 20, and opposed pairs 510/540, 520/530 of the regions can measure components of acceleration along axes passing through the respective opposed pairs simply by comparing the capacitance of one region of a pair to that or the other region of a pair. Measurement of acceleration in the x-z plane formed by the x- and z-axes shown in FIGS. 3 and 5-9 can be achieved if the accelerometer, or at least the hemispherical surfaces, are properly oriented. Thus, measurement in the x-z plane can be achieved by comparing the total capacitance of the top regions 510, 520 to the total capacitance of the bottom regions 530, 540 for the z-axis, and comparing the total capacitance of the regions of one side 510, 530 with the total capacitance of the other side 520, 540 for the x-axis.

As seen in FIGS. 9 and 10, an alternate three axis accelerometer according to an embodiment employs six electrically conductive regions 610, 620, 630, 640, 650, 660 electrically isolated from each other, three in each hemispherical surface 11, 12. Again, the electrical isolation can be achieved by leaving portions of the surfaces uncoated to form borders between the regions. The hemispheres 11, 12 have substantially identical arrangements of their electrically conductive regions, but one is rotated 180 degrees relative to the other in the x-y plane to place the regions 610, 620, 630 of the upper hemisphere 11 opposite the proof mass 20 from corresponding regions 640, 650, 660 of the lower hemisphere 12. Each region effectively forms a respective capacitor with the spaced-apart proof mass 20, and opposed pairs 610/660, 620/650, and 630/640 of the regions can measure acceleration, or at least components thereof, along axes passing through the centers of the regions of respective opposed pairs. Using three opposed pairs as seen in FIGS. 9 and 10 allows measurement along three axes so that components of acceleration along the three Cartesian mutually perpendicular axes can be measured with proper orientation of the accelerometer 10 and/or appropriate correction factors applied in conditioning circuitry and/or processing hardware and/or software.

As with the embodiments discussed above employing one and four electrically conductive regions per hemispherical surface, the electrically conductive regions of embodiments can be smaller than the respective portion of the surface to which they are applied as long as the center of each electrically conductive region coincides with the surficial center of the respective portion to which it is applied. In addition, the electrically conductive regions should all be the same size in embodiments.

In embodiments, as discussed above, the proof mass and opposed pairs of capacitors or opposed symmetric sets or groups of capacitors are connected to conditioning circuitry. The conditioning circuitry monitors capacitance between each capacitor or group of capacitors and the proof mass and provides a respective signal, such as a voltage, indicative of a differential capacitance between opposed pairs or opposed symmetric sets or groups of capacitors. Each signal is an indication of a magnitude and/or direction of acceleration experienced by the accelerometer as a function of a degree of change of the monitored capacitances from an initial value.

Thus, as seen in FIG. 11, a single axis measurement of acceleration can be achieved by connecting a first capacitance 1110 comprising a first capacitor or set of capacitors and a second capacitance 1120 comprising a second capacitor or set of capacitors 1120 to conditioning circuitry 1130. The conditioning circuitry 1130 provides a signal 1140 indicative of a differential capacitance between the first and second capacitances 1110, 1120. The signal 1140 is indicative of a magnitude and/or direction of acceleration experienced by the accelerometer as a function of a degree of change of the first and second capacitances 1110, 1120 from initial values. For example, as seen in Table 1, the conditioning circuitry 1130 could be applied to:

TABLE 1

| Embodiment of FIGS.: | 1st capacitance 1110 formed by proof mass 20 and electrically conductive regions: | 2nd capacitance 1120 formed by proof mass 20 and electrically conductive regions: |
|---|---|---|
| 3 and 4 | 310 | 320 |
| 5 and 6 | 410-440 | 450-480 |
| 5 and 6 | 410, 450 | 430, 470 |
| 5 and 6 | 420, 460 | 440, 480 |
| 5 and 6 | 410, 440, 450, 480 | 420, 430, 460, 470 |
| 5 and 6 | 410, 420, 450, 460 | 430, 440, 470, 480 |
| 7 and 8 | 510, 520 | 530, 540 |
| 7 and 8 | 510, 530 | 520, 540 |
| 9 and 10 | 610 | 660 |

TABLE 1-continued

| Embodiment of FIGS.: | 1st capacitance 1110 formed by proof mass 20 and electrically conductive regions: | 2nd capacitance 1120 formed by proof mass 20 and electrically conductive regions: |
|---|---|---|
| 9 and 10 | 620 | 650 |
| 9 and 10 | 630 | 640 |

The sets in each example can be switched between the first and second capacitances 1110, 1120 as appropriate for a particular situation in an embodiment.

Figure 12:
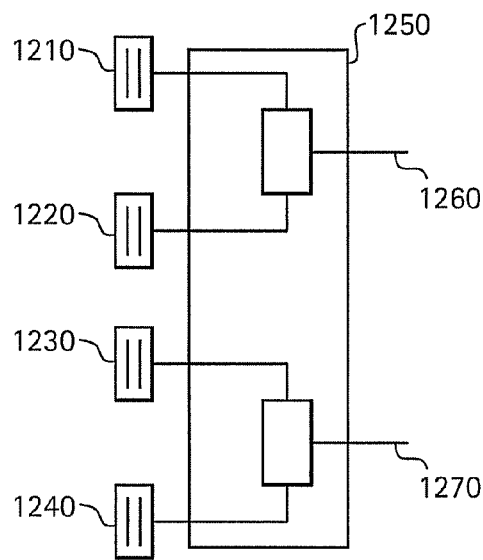

Similarly, as seen in FIG. 12, a two-axis measurement of acceleration can be achieved by connecting first, second, third, and fourth capacitances 1210-1240 to conditioning circuitry 1250. As above, each capacitance can be a single capacitor or a set of capacitors. The conditioning circuitry 1250 provides a first signal 1260 indicative of the differential capacitance between the first and second capacitances 1210, 1220 and a second signal 1270 indicative of a differential capacitance between the third and fourth capacitances. For example, as seen in Table 2, the conditioning circuitry 1250 could be applied to:

TABLE 2

| Embodiment of FIGS.: | 1st/3rd capacitance 1210/1230 formed by proof mass 20 and electrically conductive regions: | 2nd/4th capacitance 1220/1240 formed by proof mass 20 and electrically conductive regions: |
|---|---|---|
| 5 and 6 | 410-440 | 450-480 |
| 5 and 6 | 410, 450 | 430, 470 |
| 5 and 6 | 420, 460 | 440, 480 |
| 5 and 6 | 410, 440, 450, 480 | 420, 430, 460, 470 |
| 5 and 6 | 410, 420, 450, 460 | 430, 440, 470, 480 |
| 7 and 8 | 510, 520 | 530, 540 |
| 7 and 8 | 510, 530 | 520, 540 |
| 9 and 10 | 610 | 660 |
| 9 and 10 | 620 | 650 |
| 9 and 10 | 630 | 640 |

The sets in each example can be switched between the first/third capacitance 1210/1230 and second/fourth capacitances 1220/1240 as appropriate for a particular situation in an embodiment.

Figure 13:
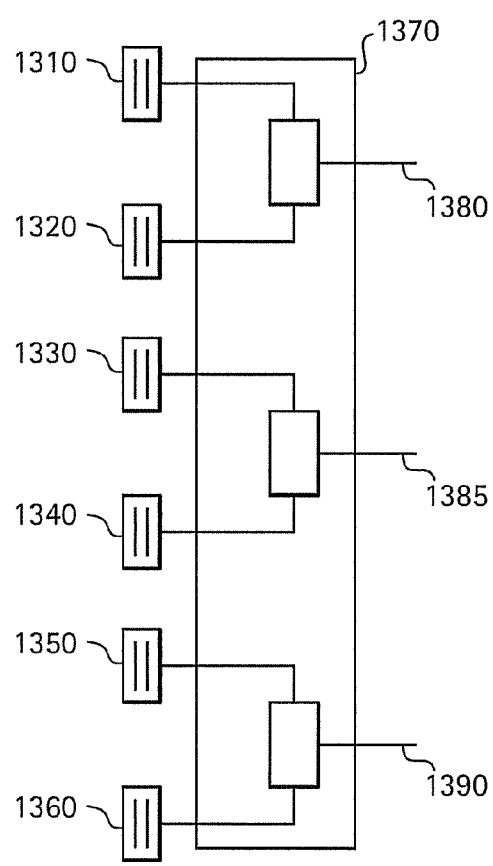

Similarly, as seen in FIG. 13, a three-axis measurement of acceleration can be achieved by connecting first, second, third, fourth, fifth, and sixth capacitances 1310-1360 to conditioning circuitry 1370. As above, each capacitance can be a single capacitor or a set of capacitors. The conditioning circuitry 1370 provides a first signal 1380 indicative of the differential capacitance between the first and second capacitances 1310, 1320 and a second signal 1385 indicative of a differential capacitance between the third and fourth capacitances 1330, 1340, and a third signal 1390 indicative of a differential capacitance between the fifth and sixth capacitances 1350, 1360. For example, as seen in Table 3, the conditioning circuitry 1370 could be applied to:

TABLE 3

| Embodiment of FIGS.: | 1st/3rd/5th capacitance 1310/1330/1350 formed by proof mass 20 and electrically conductive regions: | 2nd/4th/6th capacitance 1320/1340/1360 formed by proof mass 20 and electrically conductive regions: |
|---|---|---|
| 5 and 6 | 410-440 | 450-480 |
| 5 and 6 | 410, 450 | 430, 470 |

TABLE 3-continued

| Embodiment of FIGS.: | $1^{st}/3^{rd}/5^{th}$ capacitance 1310/1330/1350 formed by proof mass 20 and electrically conductive regions: | $2^{nd}/4^{th}/6^{th}$ capacitance 1320/1340/1360 formed by proof mass 20 and electrically conductive regions: |
|---|---|---|
| 5 and 6 | 420, 460 | 440, 480 |
| 5 and 6 | 410, 440, 450, 480 | 420, 430, 460, 470 |
| 5 and 6 | 410, 420, 450, 460 | 430, 440, 470, 480 |
| 9 and 10 | 610 | 660 |
| 9 and 10 | 620 | 650 |
| 9 and 10 | 630 | 640 |

The sets in each example can be switched between the first/third/fifth capacitance 1310/1330/1350 and second/fourth/sixth capacitances 1320/1340/1360 as appropriate for a particular situation in an embodiment.

By applying embodiments as disclosed herein, a compact and robust accelerometer is provided. In particular, a multi-axis accelerometer that can withstand extreme temperatures, such as are present in a gas turbine, is provided.

While the instant disclosure has been described with reference to one or more exemplary embodiments, it will be understood by those skilled in the art that various changes may be made and equivalents may be substituted for elements thereof without departing from the scope thereof In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

The invention claimed is:

1. An accelerometer comprising:
   concave first and second surfaces of substantially identical profile and surface area, the first surface facing the second surface, each of the first and second surfaces including a cut-out defined around an opening thereof;
   at least one electrically conductive region on a respective portion of each of the first and second surfaces;
   a proof mass supported between the first and second surfaces for movement therebetween, at least a portion of the proof mass being electrically conductive; and
   a mechanical support to support the proof mass between the first and second surfaces, deflection of the mechanical support being allowed by the cut-out of each of the first and second surfaces.

2. The accelerometer of claim 1 wherein the first and second surfaces are substantially hemispherical of substantially identical radius.

3. The accelerometer of claim 2 wherein the proof mass is concentric with centers of curvature of the first and second surfaces at an initial position and has a radius smaller than radii of the first and second surfaces.

4. The accelerometer of claim 1 wherein the first and second surfaces are formed in respective first and second plates, wherein the mechanical support -comprises a flexure plate supporting the proof mass and supported by the first and second plates.

5. The accelerometer of claim 4 wherein the first and second plates comprise ceramic material.

6. The accelerometer of claim 4 wherein the flexure plate comprises ceramic material.

7. The accelerometer of claim 4 wherein the flexure plate comprises stainless steel.

8. The accelerometer of claim 1 wherein the at least one electrically conductive region of each of the first and second surfaces is a plurality of electrically conductive regions electrically isolated from each other and arranged such that an electrically conductive region of the first surface has a corresponding opposed electrically conductive region of the second surface.

9. The accelerometer of claim 8 wherein each plurality of electrically conductive regions comprises four electrically conductive regions.

10. The accelerometer of claim 1 wherein the electrically conductive regions of the first and second surfaces comprise metal coatings.

11. The accelerometer of claim 1 wherein the proof mass comprises a sphere comprising ceramic material and the electrically conductive portion of the proof mass comprises a metal coating.

12. A system comprising:
    an accelerometer comprising:
       concave first and second surfaces, the first surface facing the second surface, each of the first and second surfaces including a cut-out defined around an opening thereof;
       at least one electrically conductive region on a respective portion of each of the first and second surfaces; and
       a proof mass supported between the first and second surfaces for movement, at least a portion of the proof mass being electrically conductive;
       a mechanical support to support the proof mass between the first and second surfaces, deflection of the mechanical support being allowed by the cut-out of each of the first and second surfaces; and
    a conditioning circuit connected to each electrically conductive region of the first and second surfaces and the electrically conductive at least a portion of the proof mass and configured to provide a signal indicative of capacitance between each electrically conductive region of the first and second surfaces and the electrically conductive at least a portion of the proof mass.

13. The system of claim 12 wherein the first and second surfaces are substantially hemispherical.

14. The system of claim 12 wherein each electrically conductive region of the first and second surfaces is centered about a surficial center of its respective portion.

15. The system of claim 12 wherein the at least one electrically conductive region of each of the first and second surfaces is a respective first plurality and second plurality of regions, each electrically conductive region of the first plurality of regions having a corresponding opposed electrically conductive region of the second plurality of regions.

16. The system of claim 15 wherein the first and second pluralities of electrically conductive regions each include four electrically conductive regions whose respective portions are each substantially a quarter of its respective one of the first and second surfaces.

17. The system of claim 15 wherein the first and second pluralities of electrically conductive regions each include two electrically conductive regions whose respective portions are each substantially a half of their respective one of the first and second surfaces.

18. The system of claim 15 wherein the first and second pluralities of electrically conductive regions each include three electrically conductive regions whose respective portions are each substantially a third of their respective one of the first and second surfaces.

19. The system of claim 15 wherein the conditioning circuitry provides a first signal indicative of a first differential capacitance between a first set of the electrically conductive regions and an opposed second set of the electrically conductive regions, a second signal indicative of a second differential capacitance between a third set of the electrically conductive regions and an opposed fourth set of the electrically conductive regions, and a third signal indicative of a third differential capacitance between a fifth set of the electrically conductive regions and an opposed sixth set of the electrically conductive regions.

* * * * *